US012768142B2

(12) United States Patent
Ohira et al.

(10) Patent No.: US 12,768,142 B2
(45) Date of Patent: Oct. 20, 2026

(54) HYDRAULIC DRIVE APPARATUS

(71) Applicant: KAWASAKI JUKOGYO KABUSHIKI KAISHA, Kobe (JP)

(72) Inventors: Masahiro Ohira, Kobe (JP); Yoshiyuki Tode, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 148 days.

(21) Appl. No.: 18/846,404

(22) PCT Filed: Mar. 10, 2023

(86) PCT No.: PCT/JP2023/009375
§ 371 (c)(1),
(2) Date: Apr. 25, 2025

(87) PCT Pub. No.: WO2023/176733
PCT Pub. Date: Sep. 21, 2023

(65) Prior Publication Data

US 2026/0002342 A1 Jan. 1, 2026

(30) Foreign Application Priority Data

Mar. 15, 2022 (JP) ................................ 2022-040797

(51) Int. Cl.
*E02F 9/22* (2006.01)
*F15B 11/16* (2006.01)

(52) U.S. Cl.
CPC .......... *E02F 9/2267* (2013.01); *E02F 9/2225* (2013.01); *F15B 11/163* (2013.01);
(Continued)

(58) Field of Classification Search
CPC .......... F15B 11/162; F15B 2211/41509; F15B 2211/7053; F15B 2211/7058
See application file for complete search history.

(56) References Cited

U.S. PATENT DOCUMENTS 6,581,506 B1 * 6/2003 Shimada .............. F15B 11/162 91/513
11,713,775 B2 * 8/2023 Maro .................... A01B 63/32 60/461
(Continued)

FOREIGN PATENT DOCUMENTS

JP 2020026828 A 2/2020

*Primary Examiner* — Thomas E Lazo
(74) *Attorney, Agent, or Firm* — Alleman Hall LLP

(57) ABSTRACT

This hydraulic drive apparatus supplies a working fluid to each of a travel motor and a loading actuator and includes: a hydraulic pump that discharges the working fluid; a travel system hydraulic circuit that is connected to a first passage branching from a pump passage connected to the hydraulic pump and controls a flow of the working fluid to the travel motor; a loading system hydraulic circuit that is connected to a second passage branching from the pump passage connected to the hydraulic pump and controls a flow of the working fluid to the loading actuator; and a flow rate control valve that is interposed in the second passage and controls an opening degree of the second passage according to a travel-end supply pressure that is a pressure being supplied to the travel motor and a loading-end supply pressure that is a pressure being supplied to the loading actuator.

6 Claims, 3 Drawing Sheets

(52) U.S. Cl.
CPC ............... *F15B 2211/41509* (2013.01); *F15B 2211/7053* (2013.01); *F15B 2211/7058* (2013.01); *F15B 2211/7135* (2013.01)

(56) References Cited

U.S. PATENT DOCUMENTS

| | | | | |
|---|---|---|---|---|
| 2016/0376768 | A1* | 12/2016 | Heemskerk ........... | E02F 9/2296<br>60/327 |
| 2018/0372131 | A1* | 12/2018 | Werner ............... | F15B 11/0423 |
| 2021/0140144 | A1* | 5/2021 | Aoki ..................... | F15B 11/162 |

* cited by examiner

HYDRAULIC DRIVE APPARATUS

TECHNICAL FIELD

The present invention relates to a hydraulic drive apparatus that supplies a working fluid to a travel motor and a loading actuator.

BACKGROUND ART

A one-pump system in which a single pump serves as hydraulic sources for a travel motor and a loading actuator of construction equipment has been put into practice. For example, a hydraulic circuit such as that disclosed in Patent Literature (PTL) 1 is known as a hydraulic drive apparatus for the one-pump system. In the hydraulic circuit disclosed in PTL 1, a pump is connected to a travel motor and a loading actuator via a first pump line and a second pump line. A priority valve is provided on the second pump line. A travel-end supply pressure that is a pressure being supplied to the travel motor acts on the priority valve. Therefore, with the priority valve, when the travel-end supply pressure increases, the opening degree of the second pump line is restricted. As a result, pressure oil preferentially flows to the travel motor.

CITATION LIST

Patent Literature

PTL 1: Japanese Laid-Open Patent Application Publication No. 2020-026828

SUMMARY OF INVENTION

Technical Problem

In the hydraulic circuit disclosed in PTL 1, the priority valve restricts the opening degree of the second pump line according to the travel-end supply pressure. Meanwhile, a loading-end supply pressure that is a pressure being supplied to the loading actuator does not act on the priority valve, meaning that the actuation status of the loading actuator is not taken into consideration.

Thus, an object of the present invention is to provide a hydraulic drive apparatus capable of controlling the flow of a working fluid to a loading actuator according to the actuation status of the loading actuator.

Solution to Problem

A hydraulic drive apparatus according to the present invention supplies a working fluid to each of a travel motor and a loading actuator and includes: a hydraulic pump that discharges the working fluid; a travel system hydraulic circuit that is connected to a first passage branching from a pump passage connected to the hydraulic pump and controls a flow of the working fluid to the travel motor; a loading system hydraulic circuit that is connected to a second passage branching from the pump passage and controls a flow of the working fluid to the loading actuator; and a flow rate control valve that is interposed in the second passage and controls an opening degree of the second passage according to a travel-end supply pressure that is a pressure being supplied to the travel motor and a loading-end supply pressure that is a pressure being supplied to the loading actuator.

According to the present invention, the flow rate control valve controls the opening degree of the second passage according to the travel-end supply pressure and the loading-end supply pressure. Therefore, the opening degree of the second passage can be controlled in consideration of not only the actuation status of the travel motor, but also the actuation status of the loading actuator. Thus, the flow of the working fluid to the loading actuator can be controlled according to the actuation status of the loading actuator.

Advantageous Effects of Invention

According to the present invention, the flow of a working fluid to a loading actuator can be controlled according to the actuation status of the loading actuator.

The above object, other objects, features, and advantages of the present invention will be made clear by the following detailed explanation of preferred embodiments with reference to the attached drawings.

DESCRIPTION OF EMBODIMENTS

Hereinafter, hydraulic drive apparatuses 1, 1A according to Embodiments 1, 2 of the present invention will be described with reference to the aforementioned drawings. Note that the concept of directions mentioned in the following description is used for the sake of explanation; the orientations, etc., of elements according to the invention are not limited to these directions. Each of the hydraulic drive apparatuses 1, 1A described below is merely one embodiment of the present invention. Thus, the present invention is not limited to the embodiments and may be subject to addition, deletion, and alteration within the scope of the essence of the invention.

Embodiment 1

Figure 1:
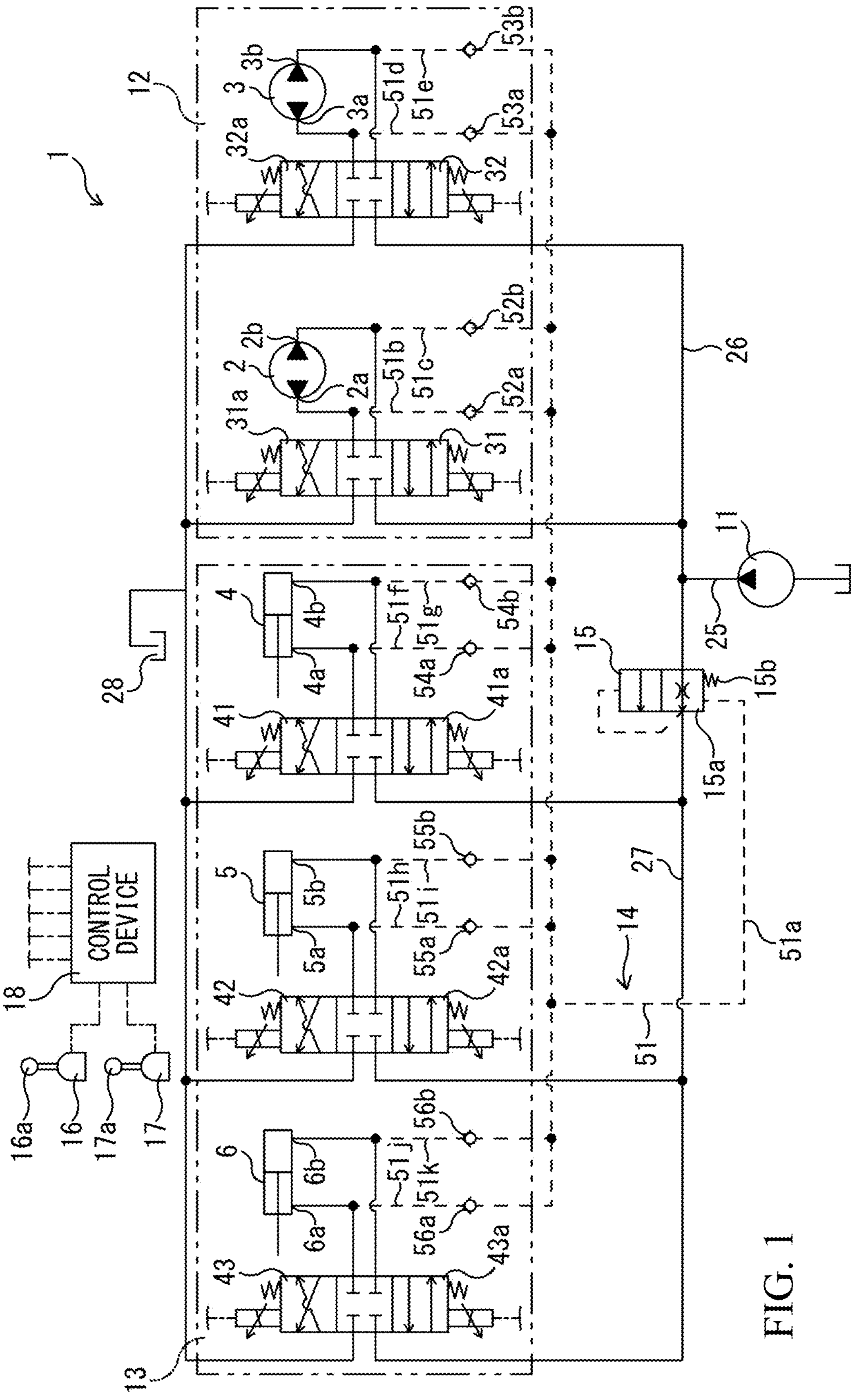
FIG. 1 is a circuit diagram illustrating the configuration of a hydraulic drive apparatus according to Embodiment 1 of the present invention.

The hydraulic drive apparatus 1 illustrated in FIG. 1 is included, for example, in a work vehicle (not illustrated in the drawings) including travel motors 2, 3 and loading actuators 4 to 6. Examples of the work vehicle include construction vehicles such as hydraulic excavators and hydraulic cranes and industrial vehicles such as forklifts. In the present embodiment, the hydraulic drive apparatus 1 is included in a hydraulic excavator, which is one example of the work vehicle. The hydraulic excavator includes a vehicle body and work equipment in addition to the hydraulic drive apparatus 1.

The vehicle body, which is a tracked vehicle, for example, includes a pair of left and right crawlers (not illustrated in the drawings) and a pair of left and right travel motors 2, 3. The vehicle body travels by actuating the pair of left and right crawlers. Note that the vehicle body may be a wheeled device; it is sufficient that the vehicle body be a device capable of traveling. The travel motors 2, 3, which are hydraulic motors, drive the left and right crawlers, respectively. More specifically, the travel motor 2 includes two supply/drainage ports 2*a*, 2*b*, and the travel motor 3 includes two supply/drainage ports 3*a*, 3*b*. The travel motors 2, 3 rotate in a normal direction when the working fluid is supplied to one of the supply/drainage ports, namely, the supply/drainage ports 2*a*, 3*a*, and rotate in the reverse direction when the working fluid is supplied to the other of the supply/drainage ports, namely, the supply/drainage ports 2*b*, 3*b*.

The work equipment includes a boom, an arm, a bucket (all of which are not illustrated in the drawings), and a plurality of loading actuators 4 to 6. The work equipment is rotatably provided on the vehicle body. In the present embodiment, the loading actuators 4 to 6 are hydraulic cylinders 4 to 6. The hydraulic cylinders 4 to 6 are provided on the boom, the arm, and the bucket, respectively. The work equipment moves the boom, the arm, and the bucket by extending and retracting the three hydraulic cylinders 4 to 6. Thus, the work equipment can perform various tasks.

Hydraulic Drive Apparatus

The hydraulic drive apparatus 1 includes a hydraulic pump 11, a travel system hydraulic circuit 12, a loading system hydraulic circuit 13, a supply pressure selection circuit 14, and a flow rate control valve 15. Furthermore, the hydraulic drive apparatus 1 includes a travel system operation device 16, a loading system operation device 17, and a control device 18. The hydraulic drive apparatus 1, which is a so-called one-pump system, supplies the working fluid from one hydraulic pump 11 to the travel motors 2, 3 and the three third hydraulic cylinders 4 to 6. By supplying the working fluid to the first travel motor 2 and the second travel motor 3, the hydraulic drive apparatus 1 actuates the crawlers corresponding, respectively, to the travel motors 2, 3. Thus, the hydraulic drive apparatus 1 can cause the hydraulic excavator to travel. By supplying the working fluid to the hydraulic cylinders 4 to 6, the hydraulic drive apparatus 1 actuates the corresponding boom, arm, and bucket. Thus, the hydraulic drive apparatus 1 can cause the hydraulic excavator to perform various tasks.

Hydraulic Pump

The hydraulic pump 11 discharges the working fluid. More specifically, the hydraulic pump 11 is connected to a drive source not illustrated in the drawings (for example, an engine and an electric motor). The hydraulic pump 11 is connected to a pump passage 25. The hydraulic pump 11 is rotatably driven by the drive source and thereby discharges the working fluid to the pump passage 25. The pump passage 25 is divided as a first passage 26 and a second passage 27.

Travel System Hydraulic Circuit

The travel system hydraulic circuit 12 includes a first traveling directional control valve 31 and a second traveling directional control valve 32. The travel system hydraulic circuit 12 is connected to the first passage 26, the first travel motor 2, and the second travel motor 3. The travel system hydraulic circuit 12 supplies the working fluid to each of the first travel motor 2 and the second travel motor 3. The travel system hydraulic circuit 12 controls the flow of the working fluid to each of the first travel motor 2 and the second travel motor 3. More specifically, the travel system hydraulic circuit 12 supplies, to the first travel motor 2 and the second travel motor 3, the working fluid that flows (in the present embodiment, at a flow rate in a flow direction) according to the input first travel command and the input second travel command.

The first traveling directional control valve 31 includes a first traveling spool 31*a*. The first traveling directional control valve 31 controls the flow of the working fluid to the first travel motor 2. More specifically, the first traveling directional control valve 31 is connected to the first passage 26, a tank 28, and the two supply/drainage ports 2*a*, 2*b* of the first travel motor 2. The first traveling spool 31*a* moves according to the input first travel command. As a result, destinations to which the supply/drainage ports 2*a*, 2*b* are connected are switched to the first passage 26 and the tank 28. The first traveling spool 31*a* changes the opening degree according to the position thereof. Therefore, the working fluid is supplied from the first traveling directional control valve 31 to the first travel motor 2 at a flow rate corresponding to the first travel command, in a direction corresponding to the first travel command. Thus, the first traveling directional control valve 31 causes the first travel motor 2 to rotate in normal and reverse directions according to the first travel command, and causes the first travel motor 2 to rotate at a speed corresponding to the first travel command. In the present embodiment, the first traveling directional control valve 31 is an electrically controlled directional control valve.

The second traveling directional control valve 32 includes a second traveling spool 32*a*. The second traveling directional control valve 32 controls the flow of the working fluid to the second travel motor 3. More specifically, the second traveling directional control valve 32 is connected to the first passage 26 so as to be parallel to the first traveling directional control valve 31. Furthermore, the second traveling directional control valve 32 is connected to the tank 28 and the two supply/drainage ports 3*a*, 3*b* of the second travel motor 3. The second traveling spool 32*a* moves according to the input second travel command. As a result, destinations to which the supply/drainage ports 3*a*, 3*b* are connected are switched to the first passage 26 and the tank 28. The second traveling spool 32*a* changes the opening degree according to the position thereof. Therefore, the working fluid is supplied from the second traveling directional control valve 32 to the second travel motor 3 at a flow rate corresponding to the second travel command, in a direction corresponding to the second travel command. Thus, the second traveling directional control valve 32 causes the second travel motor 3 to rotate in normal and reverse directions according to the second travel command, and causes the second travel motor 3 to rotate at a speed corresponding to the second travel command. In the present embodiment, the second traveling directional control valve 32 is an electrically controlled directional control valve.

Loading System Hydraulic Circuit

The loading system hydraulic circuit 13 includes a plurality of loading directional control valves 41 to 43. In the present embodiment, the loading system hydraulic circuit 13 includes three loading directional control valves 41 to 43. The three loading directional control valves 41 to 43 are a boom directional control valve 41, an arm directional control valve 42, and a bucket directional control valve 43. The loading system hydraulic circuit 13 is connected to the second passage 27 and the three hydraulic cylinders 4 to 6. The loading system hydraulic circuit 13 supplies the working fluid to each of the three hydraulic cylinders 4 to 6. The loading hydraulic circuit 13 controls the flow of the working fluid to each of the hydraulic cylinders 4 to 6. More specifically, the loading system hydraulic circuit 13 supplies, to the three hydraulic cylinders 4 to 6, the working fluid that flows (in the present embodiment, at a flow rate in a flow direction) according to the input loading command.

The three loading directional control valves 41 to 43 include loading spools 41*a* to 43*a*, respectively. The three loading directional control valves 41 to 43 control the flow of the working fluid to the corresponding hydraulic cylinders 4 to 6. Specifically, the boom directional control valve 41 controls the flow of the working fluid to the boom cylinder 4. The arm directional control valve 42 controls the flow of the working fluid to the arm cylinder 5. The bucket directional control valve 43 controls the flow of the working fluid to the bucket cylinder 6. The three loading directional control valves 41 to 43 are connected to the second passage 27 so as to be parallel to each other. Furthermore, the three loading directional control valves 41 to 43 are connected to the tank 28 and rod-end ports 4*a*, 5*a*, 6*a* and head-end ports 4*b*, 5*b*, 6*b* of the hydraulic cylinders 4 to 6. The loading spools 41*a* to 43*a* move according to a boom command, an arm command, and a bucket command. Thus, directions to which the rod-end ports 4*a* to 6*a* and the head-end ports 4*b* to 6*b* are connected switch to the second passage 27 and the tank 28. The loading spools 41*a* to 43*a* change the opening degrees according to the positions thereof. Therefore, the working fluid is supplied from each of the loading directional control valves 41 to 43 to a corresponding one of the hydraulic cylinders 4 to 6 at a flow rate corresponding to a corresponding one of the commands, in a direction corresponding to said command. This allows the loading directional control valves 41 to 43 to extend and retract the corresponding hydraulic cylinders 4 to 6 at speeds corresponding to the corresponding commands. Note that the loading directional control valves 41 to 43 are also electrically controlled directional control valves in the present embodiment.

Supply Pressure Selection Circuit

The supply pressure selection circuit 14 includes a pilot passage 51 and a plurality of check valves 52*a* to 56*a*, 52*b* to 56*b*. The supply pressure selection circuit 14 selects and outputs the maximum pressure among the travel-end supply pressure and the loading-end supply pressure. More specifically, the supply pressure selection circuit 14 is connected to the travel system hydraulic circuit 12 and the loading system hydraulic circuit 13. In the present embodiment, the supply pressure selection circuit 14 is connected to the supply/drainage ports 2*a*, 2*b*, 3*a*, 3*b* of the travel motors 2, 3 and the rod-end ports 4*a* to 6*a* and the head-end ports 4*b* to 6*b* of the loading actuators 4 to 6. The supply pressure selection circuit 14 selects and outputs the maximum pressure of the first travel-end supply pressure, the second travel-end supply pressure, and the plurality of loading-end supply pressures. The first travel-end supply pressure is a pressure being supplied to the first travel motor 2, and the second travel-end supply pressure is a pressure being supplied to the second travel motor 3. The plurality of loading-end supply pressures are pressures being supplied to the hydraulic cylinders 4 to 6.

The pilot passage 51 is connected in parallel with the travel system hydraulic circuit 12 and the loading system hydraulic circuit 13. More specifically, the pilot passage 51 includes an output passage portion 51*a* and a plurality of passage portions 51*b* to 51*k*. The plurality of passage portions (in the present embodiment, 10 passage portions) 51*b* to 51*k* are connected to the output passage portion 51*a* so as to be parallel to each other. The output passage portion 51*a* is connected to the supply/drainage ports 2*a*, 2*b*, 3*a*, 3*b* of the travel motors 2, 3 and the rod-end ports 4*a* to 6*a* and the head-end ports 4*b* to 6*b* of the loading actuators 4 to 6 via the passage portions 51*b* to 51*k*. Furthermore, the output passage portion 51*a* is connected to the flow rate control valve 15 to be described later.

The plurality of check valves (in the present embodiment, ten check valves) 52*a* to 56*a*, 52*b* to 56*b* are interposed in the ten passage portions 51*b* to 51*k*. The check valves 52*a* to 56*a*, 52*b* to 56*b* allow the flow of the working fluid from the ports 2*a* to 6*a*, 2*b* to 6*b* to the output passage portion 51*a* (more specifically, the flow of the pilot fluid), and block the opposite flow of the working fluid. Therefore, the ten check valves 52*a* to 56*a*, 52*b* to 56*b* output the maximum pressure among the fluid pressures at the ports 2*a* to 6*a*, 2*b* to 6*b* to the output passage portion 51*a* as the maximum pressure among the first travel-end supply pressure, the second travel-end supply pressure, and the plurality of loading-end supply pressures.

Flow Rate Control Valve

The flow rate control valve 15, which is a spool valve, for example, includes a control spool 15*a*. The flow rate control valve 15 is interposed in the second passage 27. The flow rate control valve 15 controls the opening degree of the second passage 27 according to the travel-end supply pressure and the loading-end supply pressure. The flow rate control valve 15 is a hydraulic pilot valve. More specifically, the flow rate control valve 15 controls the opening degree of the second passage 27 according to the first travel-end supply pressure, the second travel-end supply pressure, and the plurality of loading-end supply pressures. In the present embodiment, the flow rate control valve 15 receives the maximum pressure that is output from the supply pressure selection circuit 14 and the downstream pressure of the flow rate control valve 15 in directions toward each other. When the maximum pressure increases, the flow rate control valve 15 restricts the opening degree of the second passage 27. In the present embodiment, one flow rate control valve 15 is provided for one hydraulic pump 11 in the hydraulic drive apparatus 1. In the hydraulic drive apparatus 1, one flow rate control valve 15 allows the working fluid to preferentially flow to the travel system hydraulic circuit 12.

The control spool 15*a* receives the maximum pressure that is output from the supply pressure selection circuit 14 and the downstream pressure of the flow rate control valve 15 in directions toward each other. The control spool 15*a* is biased by a spring 15*b* in a direction against the downstream pressure. The control spool 15*a* moves to a position at which the control spool 15*a* strikes a balance between the maximum pressure, the downstream pressure, and the biasing force of the spring 15*b*. Thus, the control spool 15*a* restricts the opening degree of the second passage 27 to an opening degree corresponding to the maximum pressure.

Travel System Operation Device

The travel system operation device 16 is a device for an operator to operate the travel motors 2, 3. The travel system operation device 16 includes a traveling operation lever 16*a* which is, for example, an operation tool. The traveling operation lever 16*a* can be tilted. In the present embodiment, the traveling operation lever 16*a* can be tilted in all directions, for example. The travel system operation device 16 outputs a travel operation command corresponding to the direction of tilt and the amount of tilt. Note that the operation tool included in the travel system operation device 16 may be an operation pedal, and the form thereof is not limited.

Loading System Operation Device

The loading system operation device 17 is a device for an operator to operate an attachment (that is a bucket in the present embodiment). More specifically, an operation tool in the loading system operation device 17 includes a loading operation lever 17*a*. The loading operation lever 17*a* can be tilted. In the present embodiment, the loading operation lever 17*a* can be tilted in the depth direction, for example. The loading system operation device 17 outputs a loading operation command corresponding to the direction of tilt and the amount of tilt. Note that the operation tool included in the loading system operation device 17 is not limited to the loading operation lever 17*a* and may be in other forms such as an operation panel.

Control Device

The control device 18 controls the operation of the travel system hydraulic circuit 12. More specifically, the control device 18 obtains the travel operation command that is output from the travel system operation device 16. Accordingly, the control device 18 controls the movement of the first traveling directional control valve 31 and the second traveling directional control valve 32 (specifically, the positions of the spools 31*a*, 32*a*) according to the travel operation command. In the present embodiment, the control device 18 outputs the first travel command and the second travel command according to the travel operation command. As a result, the first travel motor 2 and the second travel motor 3 rotate at rotational speeds corresponding to the travel operation command, in directions corresponding to the travel operation command, and thus the hydraulic excavator moves at a speed corresponding to the travel operation command, in a direction corresponding to the travel operation command.

Furthermore, the control device 18 controls the operation of the loading system hydraulic circuit 13. More specifically, the control device 18 obtains the loading operation command that is output from the loading system operation device 17. Accordingly, the control device 18 controls the movement of the loading directional control valves 41 to 43 (specifically, the positions of the spools 41*a* to 43*a*) according to the loading operation command. In the present embodiment, the control device 18 outputs the boom command, the arm command, and the bucket command according to the loading operation command. Accordingly, the hydraulic cylinders 4 to 6 are extended and retracted at speeds corresponding to the loading operation command. Thus, it is possible to move the bucket at a speed corresponding to the loading operation command, in a direction corresponding to the loading operation command, allowing the hydraulic excavator to perform a predetermined task.

Operation of Hydraulic Drive Apparatus

In the hydraulic drive apparatus 1, when the traveling operation lever 16*a* of the travel system operation device 16 is operated solely, the travel system operation device 16 outputs the travel operation command. Accordingly, the control device 18 actuates the traveling directional control valves 31, 32 and controls the flow of the working fluid to the travel motors 2, 3 so that the working fluid flows (in the present embodiment, at a flow rate in a flow direction) according to the travel operation command. Thus, the control device 18 can cause the hydraulic excavator to perform a travel operation corresponding to the operation of the traveling operation lever 16*a*. Note that when the working fluid is supplied to the travel motors 2, 3, one of the first travel-end supply pressure and the second travel-end supply pressure is output from the supply pressure selection circuit 14 to the flow rate control valve 15 as the maximum pressure. As a result, the flow rate control valve 15 restricts the opening degree of the second passage 27.

Next, in the hydraulic drive apparatus 1, when the loading operation lever 17*a* of the loading system operation device 17 is operated solely, the loading system operation device 17 outputs the loading operation command. Accordingly, the control device 18 actuates the loading directional control valves 41 to 43 and controls the flow of the working fluid to the hydraulic cylinders 4 to 6 so that the working fluid flows (in the present embodiment, at a flow rate in a flow direction) according to the loading operation command. Thus, the control device 18 can cause the bucket to perform an operation corresponding to the operation of the loading operation lever 17*a*.

Furthermore, when the loading operation lever 17*a* is operated solely, the working fluid is supplied to the hydraulic cylinders 4 to 6 and thus one of the three loading-end supply pressures is output from the supply pressure selection circuit 14 to the flow rate control valve 15 as the maximum pressure. As a result, the flow rate control valve 15 controls the opening degree of the second passage 27 according to the maximum pressure that is output from the supply pressure selection circuit 14. More specifically, the maximum pressure that is one of the three loading-end supply pressures is less than the downstream pressure of the flow rate control valve 15 due to the pressure loss, etc., of the second passage 27. Therefore, when the loading operation lever 17*a* is operated solely, the flow rate control valve 15 opens the second passage 27.

Furthermore, when the traveling operation lever 16*a* and the loading operation lever 17*a* are operated at the same time, the hydraulic drive apparatus 1 operates as follows. The control device 18 actuates the directional control valves 31, 32, 41 to 43 according to the commands as in the case where the levers are operated solely. As a result, the working fluid is supplied to the travel motors 2, 3 and the hydraulic cylinders 4 to 6. The supply pressure selection circuit 14 outputs the greatest pressure among the hydraulic pressures at the ports 2*a* to 6*a*, 2*b* to 6*b* of the travel motors 2, 3 and the hydraulic cylinders 4 to 6 to the flow rate control valve 15 as the maximum pressure.

For example, when one of the first travel-end supply pressure and the second travel-end supply pressure is output from the supply pressure selection circuit 14 to the flow rate control valve 15 as the maximum pressure, the following occurs. The flow rate control valve 15 restricts the opening degree of the second passage 27 according to the maximum pressure that is one of the first travel-end supply pressure and the second travel-end supply pressure. As a result, the working fluid preferentially flows to the first passage 26. Thus, the deficiency in the supply of the working fluid to the travel motors 2, 3 is reduced. On the other hand, when one of the three loading-end supply pressures is output from the supply pressure selection circuit 14 to the flow rate control valve 15 as the maximum pressure, the opening degree of the second passage 27 is controlled according to the maximum pressure. In the present embodiment, the second passage 27 is opened.

In the hydraulic drive apparatus 1 according to Embodiment 1, the flow rate control valve 15 controls the opening degree of the second passage 27 according to the travel-end supply pressure and the loading-end supply pressure. Therefore, the opening degree of the second passage 27 can be controlled in consideration of not only the actuation statuses of the travel motors 2, 3, but also the actuation statuses of the hydraulic cylinders 4 to 6. Thus, the flow of the working fluid to the hydraulic cylinders 4 to 6 can be controlled according to the actuation statuses of the hydraulic cylinders 4 to 6.

In the hydraulic drive apparatus 1 according to Embodiment 1, the flow rate control valve 15 receives the maximum pressure that is output from the supply pressure selection circuit 14 and the downstream pressure of the flow rate control valve 15 in directions toward each other. When the maximum pressure increases, the flow rate control valve 15 restricts the opening degree of the second passage 27. Therefore, when the travel-end supply pressure is output as the maximum pressure, the flow rate control valve 15 can preferentially bring the working fluid to the travel motors 2, 3 by restricting the opening degree of the second passage 27. On the other hand, when the loading-end supply pressure is output as the maximum pressure, the flow rate control valve 15 can supply the downstream pressure to the loading system hydraulic circuit 13 such that the differential pressure becomes constant.

In the hydraulic drive apparatus 1 according to Embodiment 1, the loading system hydraulic circuit 13 includes the loading directional control valves 41 to 43 that control the flow of the working fluid to the hydraulic cylinders 4 to 6. Therefore, when the loading-end supply pressure is output as the maximum pressure, the upstream-downstream pressure difference of one of the loading directional control valves 41 to 43 of the hydraulic cylinders 4 to 6 with the highest load thereon can be made constant, meaning that the working fluid can flow to said one of the hydraulic cylinders 4 to 6 at a flow rate corresponding to the loading command. Thus, it is possible to move the hydraulic cylinders 4 to 6 at speeds corresponding to the loading command.

In the hydraulic drive apparatus 1 according to Embodiment 1, the supply pressure selection circuit 14 outputs the maximum pressure among the first travel-end supply pressure, the second travel-end supply pressure, and the plurality of loading-end supply pressure. Therefore, when high loads act on the first travel motor 2 and the second travel motor 3, the flow rate control valve 15 allows the working fluid to preferentially flow to the first passage 26 by restricting the opening degree of the second passage 27. On the other hand, when high loads act on the plurality of hydraulic cylinders 4 to 6, the upstream-downstream pressure of the loading system hydraulic circuit 13 can be made constant to ensure the flow rate of the working fluid flowing to the hydraulic cylinders 4 to 6 with the high loads thereon.

Embodiment 2

A hydraulic drive apparatus 1A according to Embodiment 2 has a configuration similar to the configuration of the hydraulic drive apparatus 1 according to Embodiment 1. Therefore, the configuration of the hydraulic drive apparatus 1A according to Embodiment 2 will be described focusing on differences from the hydraulic drive apparatus 1 according to Embodiment 1; elements that are the same as those of the hydraulic drive apparatus 1 according to Embodiment 1 share the same reference signs, and as such, description of the elements will be omitted.

Figure 2:
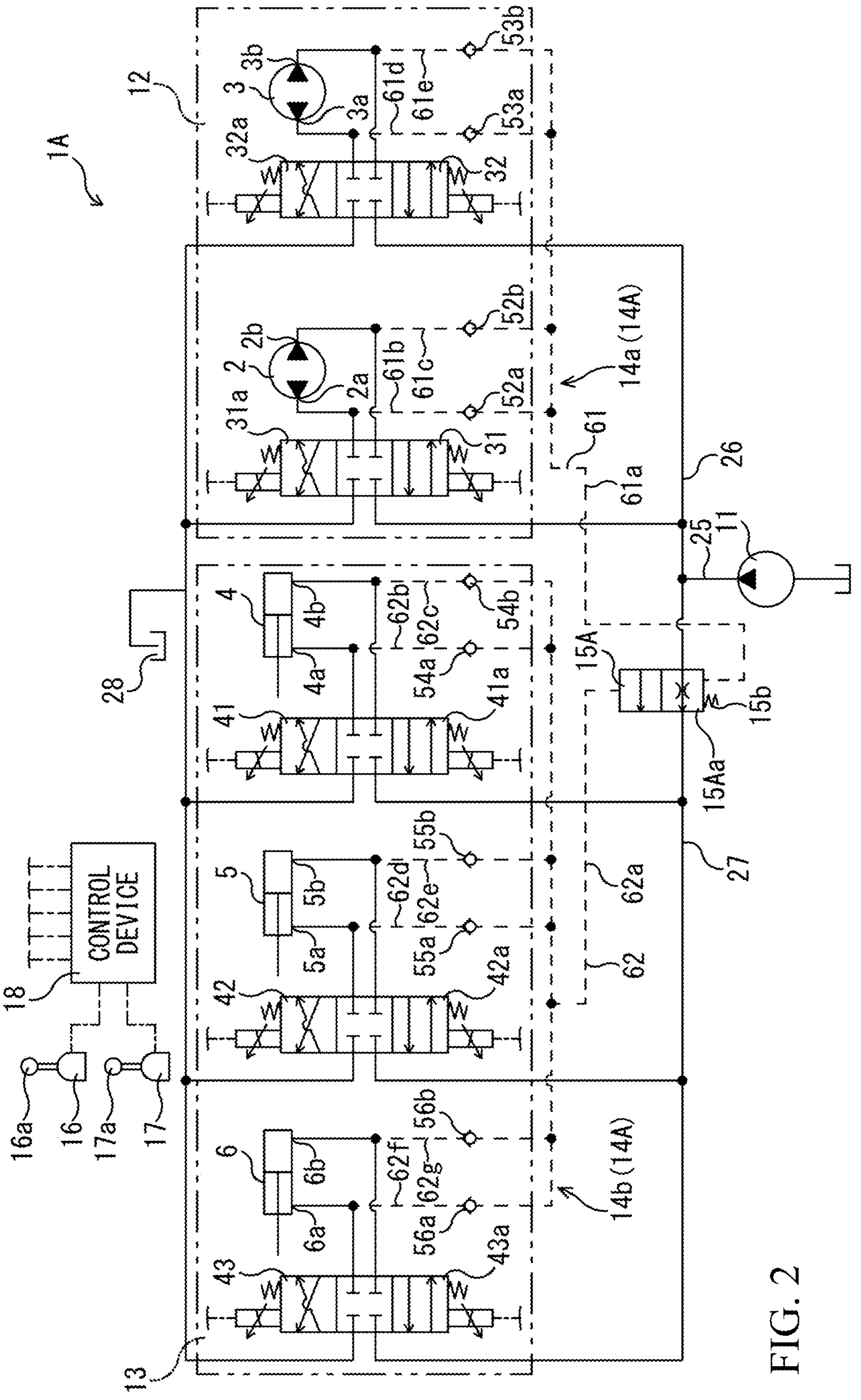
FIG. 2 is a circuit diagram illustrating the configuration of a hydraulic drive apparatus according to Embodiment 2 of the present invention.

As illustrated in FIG. 2, the hydraulic drive apparatus 1A includes the hydraulic pump 11, the travel system hydraulic circuit 12, the loading system hydraulic circuit 13, a supply pressure selection circuit 14A, and a flow rate control valve 15A. The hydraulic drive apparatus 1A further includes the travel system operation device 16, the loading system operation device 17, and the control device 18.

The supply pressure selection circuit 14A includes a travel-end circuit portion **14*a* and a loading-end circuit portion 14*b*. The supply pressure selection circuit 14**A outputs a travel-end maximum pressure that is the maximum pressure among the first travel-end supply pressure and the second travel-end supply pressure and a loading-end maximum pressure that is the maximum pressure among the three loading-end supply pressures.

The travel-end circuit portion **14*a* includes a first pilot passage 61 and four check valves 52*a*, 52*b*, 53*a*, 53*b*. The travel-end circuit portion 14*a* outputs a travel-end maximum pressure that is the maximum pressure among the first travel-end supply pressure and the second travel-end supply pressure. The first pilot passage 61 includes an output passage portion 61*a* and four passage portions 61*b* to 61*e*. The supply/drainage ports 2*a*, 2*b*, 3*a*, 3*b* of the travel motors 2, 3 are connected to the output passage portion 61*a* via the four passage portions 61*b* to 61*e* so as to be parallel to each other. Furthermore, the output passage portion 61*a* is connected to the flow rate control valve 15A. The check valves 52*a*, 52*b*, 53*a*, 53*b* are interposed in the passage portions 61*b* to 61*e*. Therefore, the travel-end circuit portion 14*a* outputs the travel-end maximum pressure to the flow rate control valve 15**A.

The loading-end circuit portion **14*b* includes a second pilot passage 62 and six check valves 54*a* to 56*a*, 54*b* to 56*b*. The loading-end circuit portion 14*b* outputs a travel-end maximum pressure that is the maximum pressure among the plurality of loading-end supply pressures. The second pilot passage 62 includes an output passage portion 62*a* and six passage portions 62*b* to 62*g*. The ports 4*a* to 6*a*, 4*b* to 6*b* of the loading actuators 4 to 6 are connected to the output passage portion 62*a* via the six passage portions 62*b* to 62*g* so as to be parallel to each other. Furthermore, the output passage portion 62*a* is connected to the flow rate control valve 15A. The check valves 54*a* to 56*a*, 54*b* to 56*b* are interposed in the passage portions 62*b* to 62*g*. Therefore, the loading-end circuit portion 14*b* outputs the loading-end maximum pressure to the flow rate control valve 15**A.

The flow rate control valve 15A, which is a spool valve, for example, includes a control spool 15Aa. The flow rate control valve 15A is interposed in the second passage 27. The flow rate control valve 15A controls the opening degree of the second passage 27 according to the travel-end supply pressure and the loading-end supply pressure. The flow rate control valve 15A is a hydraulic pilot valve. In the present embodiment, the flow rate control valve 15A receives the travel-end maximum pressure and the loading-end maximum pressure in directions toward each other. When the travel-end maximum pressure increases, the flow rate control valve 15A restricts the opening degree of the second passage 27. When the loading-end maximum pressure increases, the flow rate control valve 15A opens the second passage 27. For example, when the travel-end maximum pressure is greater than the loading-end maximum pressure, the working fluid preferentially flows to the travel system hydraulic circuit 12. On the other hand, as the travel-end maximum pressure is less than the loading-end maximum pressure, the second passage 27 is opened. Thus, it is possible to increase the flow rate of the working fluid flowing to the loading system hydraulic circuit 13.

The control spool 15Aa receives, in directions toward each other, the travel-end maximum pressure and the loading-end maximum pressure that are output from the supply pressure selection circuit 14A. Furthermore, the control spool 15Aa is biased by the spring 15*b* in a direction against the loading-end maximum pressure. The control spool 15Aa moves to a position at which the control spool 15Aa strikes a balance between the travel-end maximum pressure, the loading-end maximum pressure, and the biasing force of the spring 15*b*. Thus, the control spool 15Aa controls the opening degree of the second passage 27 so that the second passage 27 has an opening degree corresponding to the difference between the travel-end maximum pressure and the loading-end maximum pressure.

Operation of Hydraulic Drive Apparatus

In the hydraulic drive apparatus 1A, when the traveling operation lever 16*a* and the loading operation lever 17*a* are operated, the control device 18 actuates the directional control valves 31, 32, 41 to 43 according to the travel operation command and the loading operation command. As a result, the working fluid is supplied to the travel motors 2, 3 and the hydraulic cylinders 4 to 6. The supply pressure selection circuit 14A outputs the travel-end maximum pressure from the travel-end circuit portion 14*a* to the flow rate control valve 15A, and outputs the loading-end maximum pressure from the loading-end circuit portion 14*b* to the flow rate control valve 15A. Accordingly, the flow rate control valve 15A restricts the opening degree of the second passage 27 to an opening degree corresponding to the difference between the travel-end maximum pressure and the loading-end maximum pressure. When the opening degree of the second passage 27 is restricted, the working fluid preferentially flows to the first passage 26; in other words, the working fluid preferentially flows to the travel motors 2, 3. On the other hand, as the second passage 27 is opened with an increase in the loading-end maximum pressure, the flow rate of the working fluid flowing to the loading system hydraulic circuit 13 can be increased.

In the hydraulic drive apparatus 1A according to Embodiment 2, the flow rate control valve 15 receives the travel-end supply pressure and the loading-end supply pressure in directions toward each other. When the travel-end supply pressure increases, the flow rate control valve 15A restricts the second passage 27. Therefore, when the travel-end supply pressure is high, the flow rate control valve 15A allows the working fluid to preferentially flow to the travel motors 2, 3 by restricting the opening degree of the second passage 27. On the other hand, when the loading-end supply pressure is high, the flow rate control valve 15A can open the second passage 27 to ensure the flow of the working fluid to the loading system hydraulic circuit 13.

Furthermore, in the hydraulic drive apparatus 1A according to Embodiment 2, the flow rate control valve 15A receives the travel-end maximum pressure and the loading-end maximum pressure in directions toward each other. When the travel-end maximum pressure increases, the flow rate control valve 15A restricts the second passage 27. Therefore, the travel system hydraulic circuit 12 supplies the working fluid to the two travel motors 2, 3, and the loading system hydraulic circuit 13 supplies the working fluid to the plurality of hydraulic cylinders 4 to 6. Even in this case, it is possible to allow the working fluid to preferentially flow to the travel motors 2, 3, and ensure the flow of the working fluid to the loading system hydraulic circuit 13.

The hydraulic drive apparatus 1A according to Embodiment 2 produces substantially the same advantageous effects as those produced by the hydraulic drive apparatus 1 according to Embodiment 1.

Other Embodiments

The hydraulic drive apparatuses 1, 1A according to Embodiments 1, 2 include two travel motors 2, 3 to which the travel system hydraulic circuit 12 supplies the working fluid; however, there may be a single travel motor to which the travel system hydraulic circuit 12 supplies the working fluid, meaning that the number of travel motors is not limited. Similarly, the number of loading actuators to which the loading system hydraulic circuit 13 supplies the working fluid is not limited. Furthermore, the loading actuator to which the loading system hydraulic circuit 13 supplies the working fluid is not limited to the hydraulic cylinder and may be a hydraulic motor. Furthermore, in the supply pressure selection circuit 14, the check valves do not necessarily need to be provided on all the loading actuators. In other words, the supply pressure selection circuit 14 may be configured to select the maximum pressure from among the pressures of some of the plurality of loading actuators.

Furthermore, the structures of the travel system hydraulic circuit 12 and the loading system hydraulic circuit 13 in the hydraulic drive apparatuses 1, 1A according to Embodiments 1, 2 are not limited to those described above. It is sufficient that the travel system hydraulic circuit 12 and the loading system hydraulic circuit 13 be circuits capable of supplying the working fluid to the travel motors 2, 3 and the hydraulic cylinders 4 to 6. Moreover, in the hydraulic drive apparatus 1, the control device 18 may operate the travel motors 2, 3 and the loading actuators 4 to 6 according to the program stored in advance.

Figure 3:
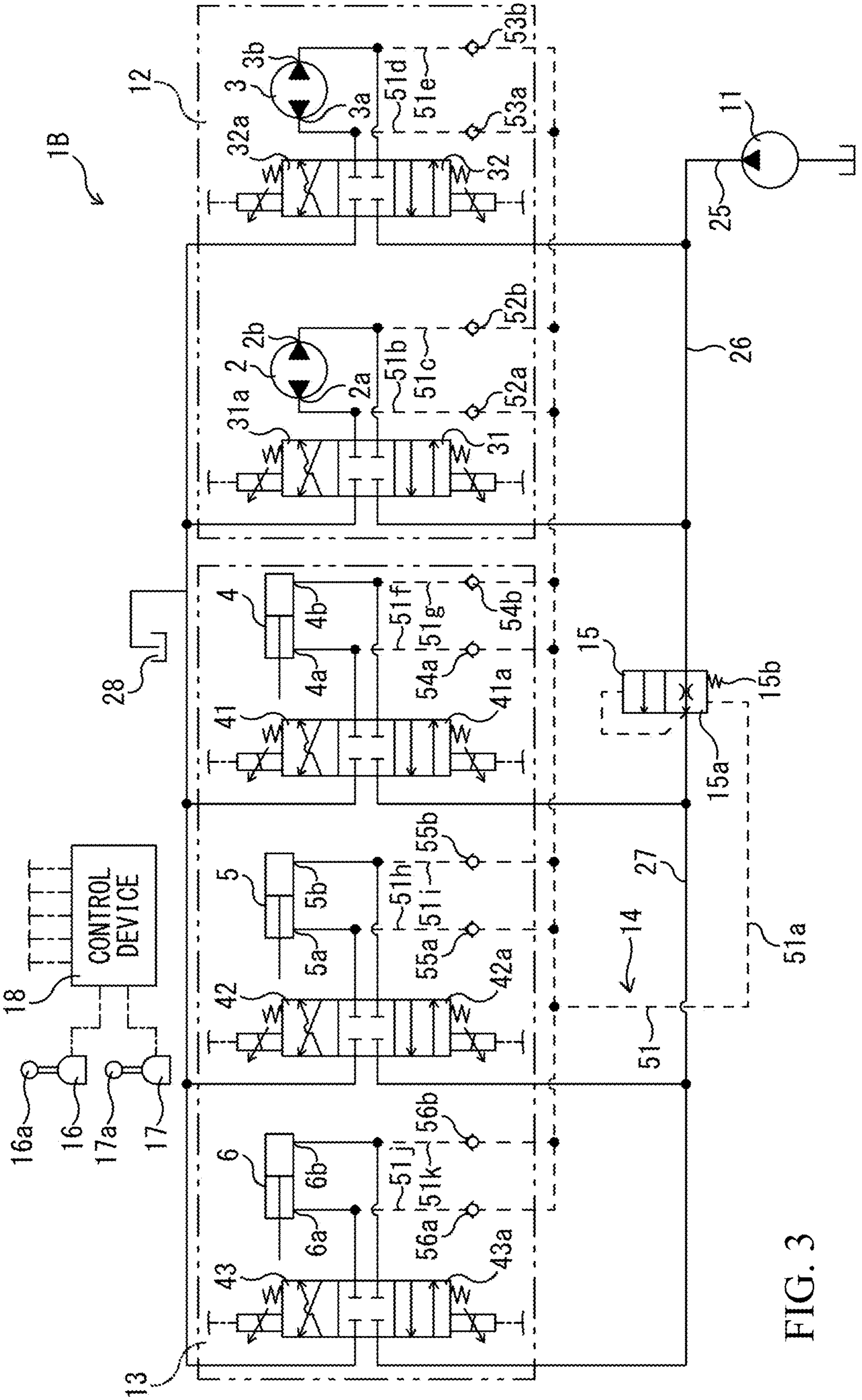
FIG. 3 is a circuit diagram illustrating the configuration of a hydraulic drive apparatus according to another embodiment of the present invention.

Furthermore, in the hydraulic drive apparatuses 1, 1A according to Embodiments 1, 2, the pump passage 25 is divided as the first passage 26 and the second passage 27, but the pump passage 25 may be configured as that in a hydraulic drive apparatus 1B according to Embodiment 3 illustrated in FIG. 3. Specifically, the first passage 26 may be connected to the pump passage 25, and the second passage 27 may be connected to the pump passage 25 via the first passage 26. In other words, the first passage 26 and the second passage 27 may be connected in series to the pump passage 25. The hydraulic drive apparatus 1B produces substantially the same advantageous effects as those produced by the hydraulic drive apparatus 1 according to Embodiment 1.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTER LIST

1, 1A, 1B hydraulic drive apparatus
2 first travel motor
3 second travel motor

4 hydraulic cylinder (loading actuator)
5 hydraulic cylinder (loading actuator)
6 hydraulic cylinder (loading actuator)
11 hydraulic pump
12 travel system hydraulic circuit
13 loading system hydraulic circuit
14, 14A supply pressure selection circuit
14_a_ travel-end circuit portion
14_b_ loading-end circuit portion
15, 15A flow rate control valve
25 pump passage
26 first passage
27 second passage
31 first traveling directional control valve
32 second traveling directional control valve
41 loading directional control valve
42 loading directional control valve
43 loading directional control valve

The invention claimed is:

1. A hydraulic drive apparatus that supplies a working fluid to a travel motor and a loading actuator, the hydraulic drive apparatus comprising:

a hydraulic pump that discharges the working fluid;

a travel system hydraulic circuit that is connected to a first passage branching from a pump passage connected to the hydraulic pump and controls a flow of the working fluid to the travel motor;

a loading system hydraulic circuit that is connected to a second passage branching from the pump passage and controls a flow of the working fluid to the loading actuator;

a flow rate control valve that is interposed in the second passage and controls an opening degree of the second passage according to a travel-end supply pressure that is a pressure being supplied to the travel motor and a loading-end supply pressure that is a pressure being supplied to the loading actuator; and a supply pressure selection circuit that selects and outputs a maximum pressure among the travel-end supply pressure and the loading-end supply pressure, wherein:

the flow rate control valve receives, in directions toward each other, the maximum pressure that is output from the supply pressure selection circuit and a downstream pressure of the flow rate control valve, and when the maximum pressure increases, restricts the opening degree of the second passage.

2. The hydraulic drive apparatus according to claim 1, wherein:

the loading system hydraulic circuit includes a loading directional control valve that controls the flow of the working fluid to the loading actuator by changing the opening degree according to a loading command that is input to the loading system hydraulic circuit.

3. The hydraulic drive apparatus according to claim 1, wherein:

the travel system hydraulic circuit supplies the working fluid to a first travel motor and a second travel motor each being the travel motor;

the loading system hydraulic circuit supplies the working fluid to each of a plurality of loading actuators including the loading actuator; and the supply pressure selection circuit outputs a maximum pressure among a pressure being supplied to the first travel motor, a pressure being supplied to the second travel motor, and pressures being supplied to the plurality of loading actuators.

4. A hydraulic drive apparatus that supplies a working fluid to a travel motor and a loading actuator, the hydraulic drive apparatus comprising:

a hydraulic pump that discharges the working fluid;

a travel system hydraulic circuit that is connected to a first passage branching from a pump passage connected to the hydraulic pump and controls a flow of the working fluid to the travel motor;

a loading system hydraulic circuit that is connected to a second passage branching from the pump passage and controls a flow of the working fluid to the loading actuator; and a flow rate control valve that is interposed in the second passage and controls an opening degree of the second passage according to a travel-end supply pressure that is a pressure being supplied to the travel motor and a loading-end supply pressure that is a pressure being supplied to the loading actuator, wherein:

the flow rate control valve receives the travel-end supply pressure and the loading-end supply pressure in directions toward each other, and when the travel-end supply pressure increases, restricts the second passage.

5. The hydraulic drive apparatus according to claim 4, further comprising:

a supply pressure selection circuit, wherein:

the travel system hydraulic circuit supplies the working fluid to a first travel motor and a second travel motor each being the travel motor;

the loading system hydraulic circuit supplies the working fluid to each of a plurality of loading actuators including the loading actuator;

the supply pressure selection circuit includes: a travel-end circuit portion that outputs a travel-end maximum pressure that is a maximum pressure among a pressure being supplied to the first travel motor and a pressure being supplied to the second travel motor; and a loading-end circuit portion that outputs a loading-end maximum pressure that is a maximum pressure among pressures being supplied to the plurality of loading actuators; and the flow rate control valve receives, in directions toward each other, the travel-end maximum pressure that is output from the travel-end circuit portion and the loading-end maximum pressure that is output from the loading-end circuit portion, and when the travel-end maximum pressure increases, restricts the second passage.

6. A hydraulic drive apparatus that supplies a working fluid to a travel motor and a loading actuator, the hydraulic drive apparatus comprising:

a hydraulic pump that discharges the working fluid;

a travel system hydraulic circuit that is connected to a first passage leading to a pump passage connected to the hydraulic pump and controls a flow of the working fluid to the travel motor;

a loading system hydraulic circuit that is connected to a second passage leading to the pump passage via the first passage and controls a flow of the working fluid to the loading actuator;

a flow rate control valve that is interposed in the second passage and controls an opening degree of the second passage according to a travel-end supply pressure that is a pressure being supplied to the travel motor and a loading-end supply pressure that is a pressure being supplied to the loading actuator; and a supply pressure selection circuit that selects and outputs a maximum pressure among the travel-end supply pressure and the loading-end supply pressure, wherein:

the flow rate control valve receives, in directions toward each other, the maximum pressure that is output from the supply pressure selection circuit and a downstream pressure of the flow rate control valve, and when the maximum pressure increases, restricts the opening degree of the second passage.

* * * * *